May 4, 1948.　　　M. K. INGOLDBY ET AL　　　2,440,687
POWER TRANSMISSION SYSTEM INCLUDING PRESSURE FLUID FOLLOW-UP SERVO-MOTOR
Filed March 19, 1942　　　4 Sheets-Sheet 1

Inventors
Thomas Frederick Clarke
Percy William Cole
Executors of Maurice
Kerr Ingoldby, deceased.
Johann Hermann Abbink-Spaink
By Loyd Hall Sutton
Attorney

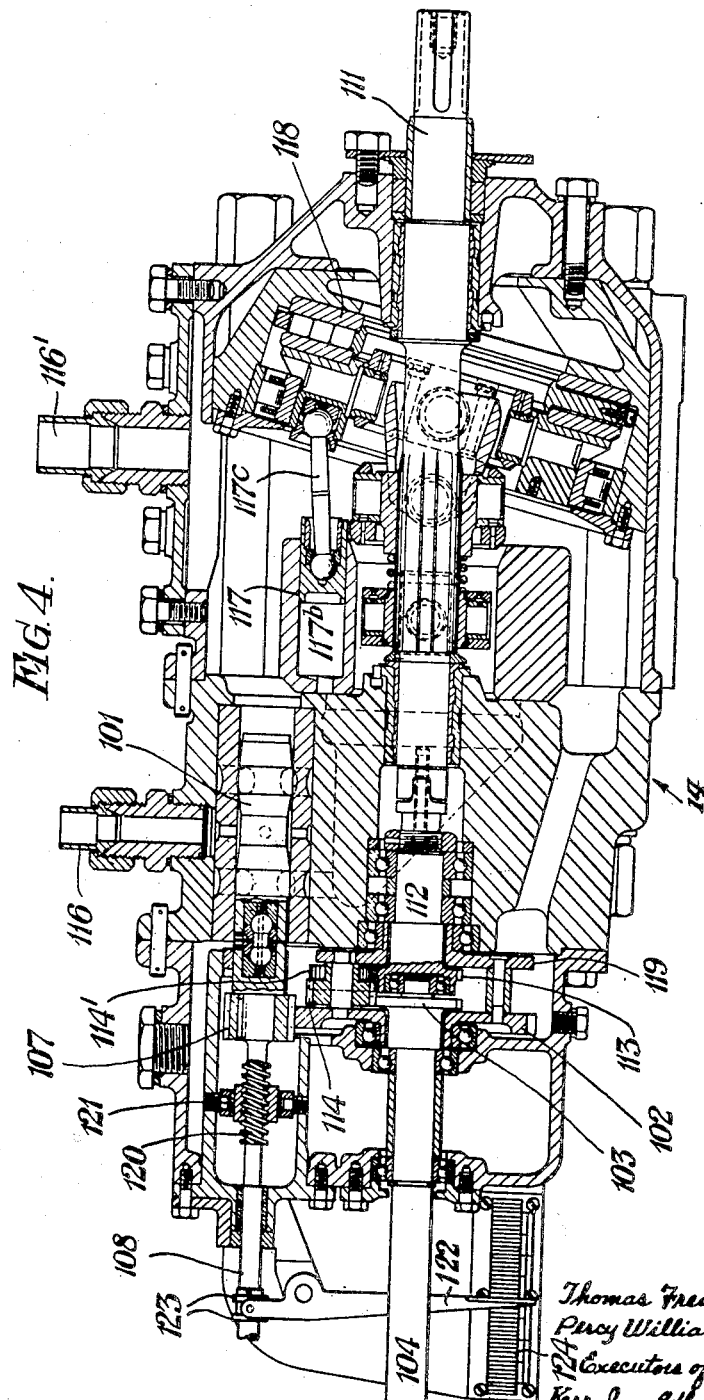

Patented May 4, 1948

2,440,687

UNITED STATES PATENT OFFICE 2,440,687

POWER TRANSMISSION SYSTEM INCLUDING PRESSURE FLUID FOLLOW-UP SERVOMOTOR

Maurice Kerr Ingoldby, deceased, late of Tynemouth, England, by Thomas Frederick Clarke, Swanley, and Percy William Cole, Purley, England, executors, and Johann Hermann Abbink-Spaink, Jesmond, Newcastle-on-Tyne 2, England, assignors to Vickers-Armstrongs Limited, London, England, a British company Application March 19, 1942, Serial No. 435,356
In Great Britain June 9, 1939

5 Claims. (Cl. 121—41)

This invention relates to power transmission systems of the repeater type for use in connection with the fire control of guns or for the control of the setting of other apparatus adapted to have imparted thereto changes in angle or direction, e. g. changes in the angle of elevation of a gun.

Up to the present many power transmission systems have been employed some of which use the well known Selsyn transmitter and receiving units. Customarily, the transmitter unit is operated from a director or other primary control device and the receiver is connected directly to the load which has to be operated according to the movements of the director. The load which is normally massive, cannot, of course, be operated from the Selsyn receiver and for purposes of the power operation, a power drive of some suitable type is provided. The power drive is arranged to be under the control of the Selsyn transmitter and receiver units, in the sense that when these units are not in alignment the power drive is brought into operation and continues to operate until alignment is achieved. With a system such as outlined, when the load approaches its alignment position, the relative displacement between the Selsyn transmitter and the Selsyn receiver is of course reduced with consequent reduction in the torque of the power drive. Hence, the synchronizing or re-setting force tends to be reduced to zero as the load approaches the desired coincident position, with the result that the accuracy of the repeater as a whole may be very low. Moreover, the load may well move, by virtue of its massive nature, to a position where it has passed its position of coincidence corresponding to the director position. In such case the Selsyn transmitter and receiver units may cause a reversal of the power drive to the massive load in an attempt to recentre the latter and, as a result, the load may then be moved past the desired recentre position once more. Such a power oscillation of the massive load can defeat the whole object of the transmission system.

From the above it will be realised that if the power drive is not itself dead-beat in action, that is to say, if it permits the massive load to have a certain amount of lost motion, the transmission system including such power drive becomes valueless. The present invention provides a solution to the problem indicated above by the provision of an electric transmission system employing Selsyn units with a swashplate hydraulic power amplifier as the power drive for the massive load. The characteristics of a swashplate hydraulic power amplifier render the latter particularly suitable for a combination in the manner indicated above, since such an amplifier is dead-beat in operation in the sense indicated above, and, moreover, the displacement of the control means of the amplifier produces at the output thereof a speed of operation which is proportional to such displacement.

Referring to the drawings:

Figure 4 is a sectional elevation through the hydraulic power amplifier.

Figure 1:
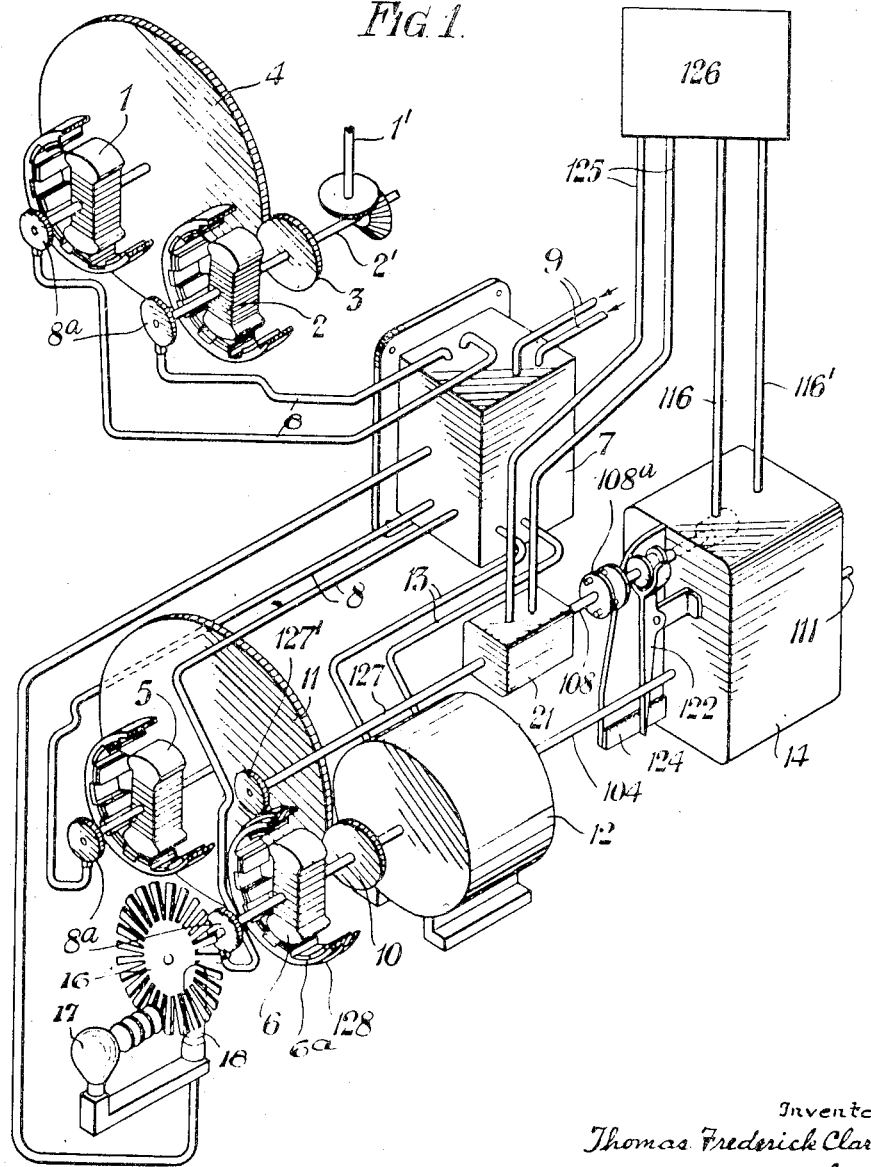
Figure 1 is a general arrangement diagrammatically illustrating a transmission system in accordance with the invention.

In describing the constructional forms of transmission system illustrated by the accompanying drawings, it will be assumed that the apparatus is applied to the adjustment of a gun mounting. There is a director or any equivalent driving member operating a shaft $1'$ driving a shaft $2'$ carrying the rotor of one of a pair of Selsyn units $1$ and $2$ of standard design, and comprising the transmission end of the apparatus. The rotors of the Selsyn units $1$ and $2$ are connected together by gear wheels $3$ and $4$ so that the movement of one produces a simultaneous movement of the other with a predetermined velocity ratio therebetween. For the sake of example, it will be supposed that for one revolution of the unit $1$ the unit $2$ by virtue of the geared connection makes $n$ revolutions. Then the unit $1$ will be hereinafter referred to as the "coarse" unit whilst the unit $2$, which has to make $n$ revolutions for one revolution of the coarse unit, will be referred to hereinafter as the "fine" unit. At the receiving end of the apparatus there are two further Selsyn units $5$ and $6$ which are precisely similar to the Selsyn units $1$ and $2$ employed at the transmitting end.

All the Selsyn units are supplied with three-phase alternating stator current from a suitable source of supply whilst all the rotors thereof are connected by way of slip-rings $3a$ with a thermionic amplifier $7$ by cables $8$, the cables supplying current to the amplifier being indicated by the reference numeral $9$. The Selsyn units $5$ and $6$ of the receiving end are geared together by gear wheels $10$ and $11$ with the same ratio as at the transmitting end, i. e. the $n:1$ ratio previously referred to. The fine unit 6 of the receiving end is mechanically coupled with the rotor of a D. C. motor 12, the armature current of which is supplied by output cables 13 leading from the amplifier 7. The motor 12 is arranged to drive the gun mounting through the medium of an hydraulic power amplifier unit 14 of the swashplate type.

A suitable construction of power amplifier is shown in Figure 4 and is similar to that described in co-pending application Serial No. 435,348, now Patent No. 2,428,025, and in which, when the input shaft 104 is turned initially, the centre member 102 of the differential gear will therefore be displaced and will cause a corresponding longitudinal displacement of the valve 101, to permit of the inflow of the operating fluid from a suitable source of supply, e. g. a hydraulic pump 126 (see Figure 1) which displacement will continue until the high torque output shaft 111 gains the speed of the input shaft 104, when the valve will remain in that position. The input shaft is mechanically connected with the output shaft by a shaft 112 forming a continuation of the output shaft, teeth 113 on the shaft 112 meshing with a pinion or pinions 114' rotatably mounted upon the side plate 119. The differential gear also includes the usual planet pinions 114, the pinions 114 and 114' meshing with each other, 114 in turn meshing with the gear wheel 103 carried by the input shaft 104, the pinions 114 and 114' being rotatably mounted upon shafts connecting the members 102 and 119 together.

The input shaft 104 is driven by the electric motor 12 of Figure 1, whilst the output shaft 111 is driven by fluid pressure controlled by means of the valve 101, the fluid entering the unit through the inlet connection 116 and after passing the valve, entering the cylinders 117, the pressure of the fluid on the pistons in the cylinders imparting a rotational movement to the output shaft through the medium of the angle box, indicated generally by the reference numeral 118, the output shaft being thus caused to rotate at high speed. The exhaust fluid returns to the source 126 by the conduit 116'. Assuming the input shaft 104 to be turned clockwise, the gear member 103 attached thereto will rotate the pinion 114 which in turn will, via the pinion 114', cause the crown wheel or centre member 102 to rotate in, say, a clockwise direction, pinion 107 thereby causing the hydraulic control valve 101 to be given a combined sliding and rotary movement, admitting fluid to the cylinders 117 causing the angle box 118 to rotate the main output shaft 111.

As in co-pending applications Serial Nos. 435,348 and 435,349, now Patents Nos. 2,428,025 and 2,412,366, the hydraulic power amplifier 14 is provided with a correction unit indicated generally by the reference numeral 21 (see Figure 1) this correction unit being a smaller edition of the hydraulic power amplifier 14 and having as its input shaft the shaft 108 operating the valve 101. Original Figure 4 of application Serial No. 435,348, and the single original figure of application Serial No. 435,349, both show a connection between the valve shaft of the hydraulic power amplifier and the correction unit which is the equivalent of that disclosed herein. In the present embodiment, the appropriate part of the shaft 108 is divided to afford a slidable connection 108a whereby the end of the shaft 108 operating the valve 101 can have translative movements imparted to it for actuating the valve without displacing axially the end of the shaft 108 acting as the input shaft for the correction unit 21. The translative movement of the valve operating end of the shaft 108 is obtained by reason of a worm 120 operating within a nut 121 fixed within the housing of the power amplifier 14, the axial dimension of the pinion 107 being sufficient to cover this displacement of the shaft 108 to which it is splined without the pinion 107 disengaging from the gear member 102. The axial displacement of the appropriate end of the shaft 108 can be indicated by a pointer 122 operated from an abutment 123 on the shaft, the free end of this pointer traversing a scale 124.

The correction unit 21 is connected by conduits 125 to the said source of hydraulic pressure 126, this supply being regulated by a valve which operates within the housing of the unit 21 in a manner identical with the valve 101 of the power amplifier 14, i. e. through a differential gear forming a couple between the input shaft 108 and an output shaft 127, this output shaft being driven in the same manner as the output shaft 111 and carrying a pinion 127' meshing with gear teeth 128 on the periphery of the casing 6a of the repeater unit 6.

When the input shaft 104 of the power amplifier 14 is initially rotated by motor 12, the centre member 102 of the differential gear not only shifts the valve 101 from its neutral position so as to start the hydraulic motor drive of output shaft 111, but also rotates the input shaft 108 of correction unit 21, which in turn causes the output shaft 127 of said unit to be hydraulically driven and through the pinion 127' to rotate the stator 6a of the Selsyn receiver unit in such a manner as to advance the rotor 6, motor 12 and shaft 104 with respect to the initiating shaft 1' of the transmitter end of the system in the same proportion that the output shaft 111 lags behind the input shaft 104.

The valve 101 of the hydraulic amplifier 14 is, by the foregoing arrangement, adapted to be reset towards its zero position with the aid of the differential gear embodying the members 102, 103, 113, 114 and 114'. It will be apparent that contemporaneously with this adjustment of re-setting of the valve 101 the input shaft of the correction unit 21 will be rotated with consequent displacement of the valve appropriate to the unit 21 and actuation of the hydraulic motor of such unit, this resulting in the output shaft 127 having imparted thereto a movement proportional to lag between the input shaft 104 and output shaft 111 of the power amplifier 14, the desired correction being derived from the fact that the motor 12 has its armature supplied with current in the one direction or the other corresponding to the direction of phase displacement arising out of the aforesaid adjustment of the casing 6a of the Selsyn unit 6.

It will be noted that the main output shaft 111 is in driving connection with the toothed shaft 112 which causes the planet pinion or pinions associated therewith to rotate, which in turn causes the crown wheel 102 to rotate in an anti-clockwise direction, thereby restoring the sliding valve 101 to its original position and bringing the apparatus to rest.

It will thus be seen that when the input shaft 104 is rotated through 10° and then brought to rest, the output shaft 111 is correspondingly turned through 10° and comes to rest.

It will also be appreciated that in order to keep the shaft 111 rotating, it is necessary to continue to rotate the input shaft 104.

It will further be appreciated that the relative angular displacement between the shaft 104 and shaft 111 by the differential gear determines the amount of valve opening of the sliding valve 101, and therefore that for a given output torque, any increase in the speed of shaft 111 is due to an increase in the lag or angular displacement between shafts 104 and 111.

The lag between the shafts represents a measure of the rate of angular displacement of the output shaft 111 when the latter and the input shaft are operating in synchronism. A change in velocity of input will momentarily increase such lag and result in alteration of the velocity of the output. Known swash-plate engines of the kind here concerned are in themselves practically dead-beat in action in the sense that a displacement of the control valve 101 produces a proportional change in the rate of displacement of the output torque shaft. Thus undesired "hunting" of the load driven by the output shaft is reduced to a minimum.

The rotor of unit 6 may drive a serrated disc 16 which, when rotated, permits light impulses from the filament of a lamp or other illuminent 17 to fall on a photo-electric cell 18 and the frequency of light impulses on this photo cell determines (through suitable thermionic means) the field strength of the motor 12.

Figure 3:
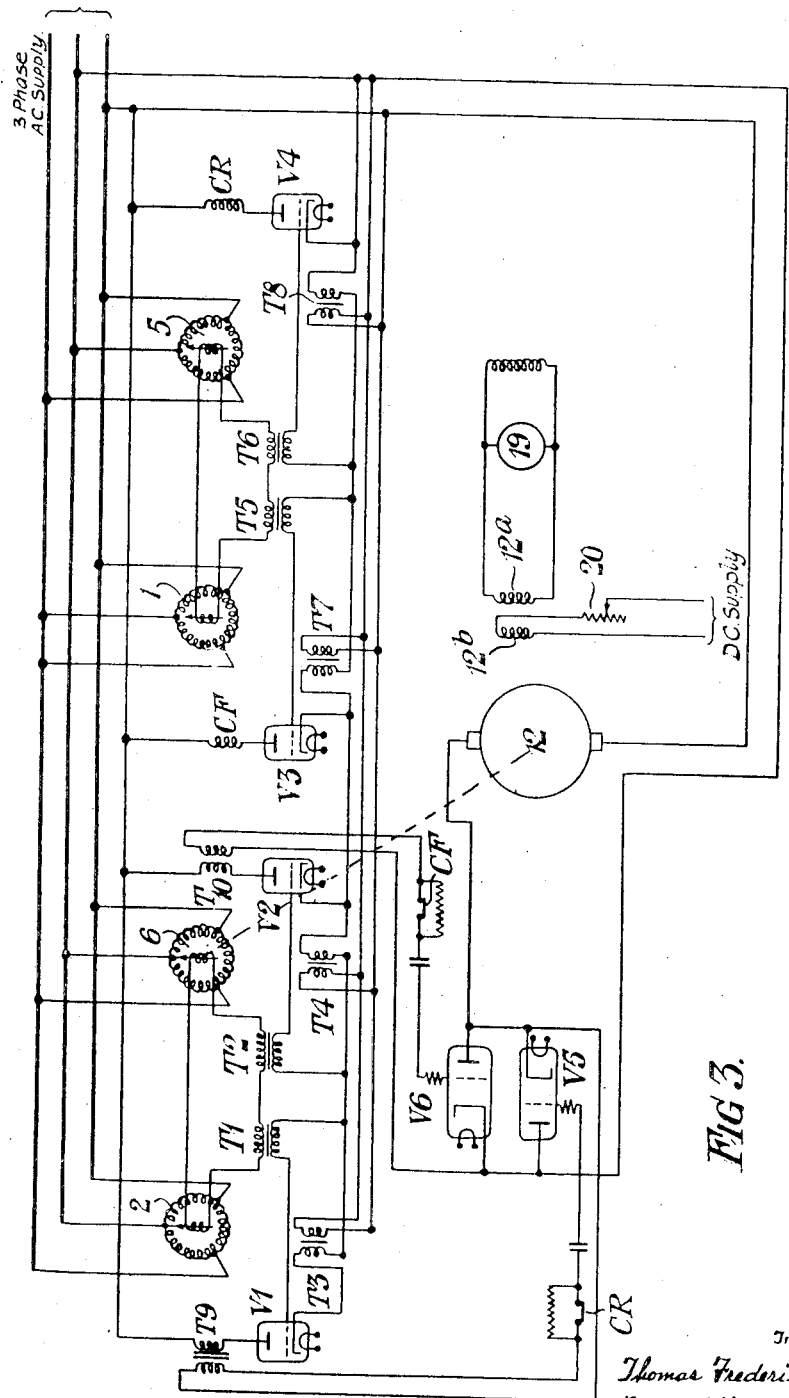
Figure 3 is a wiring diagram of the system.

Referring to Figure 3, it will be observed that the motor 12 has two fields. One field 12b is energised from a suitable D. C. supply and its strength is adjustable by means of a rheostat 20. A second field 12a is energised by the generator 19. The generator 19 may be driven either by the transmitter part of the equipment, or by the movement of the gun or any associated part of either system.

The generator 19 is of the type which supplies direct current of unchanging polarity irrespective of the direction of its mechanical drive, such direct current being in magnitude proportional to the speed of the drive. In Figure 1 the elements 16, 17, 18 are illustrated and it will be understood that they could be replaced by the generator 19. In Figure 3 the generator 19 is diagrammatically indicated in order to maintain the simplicity of the circuit diagram, since electrically the effect obtained is equivalent. In the specification of co-pending patent application No. 435,355, now Patent No. 2,422,197, there is illustrated and described an electrical circuit designed to produce from a pulsating input, an output of electrical power in magnitude proportional to the frequency of such input pulsations. It may here be mentioned that a suitable electrical circuit has connections from the cell 18 to a pentode valve and a power tri-ode valve. The power tri-ode is choke capacity coupled to the aforementioned pentode, and the characteristic is arranged to give amplification proportional to the frequency of the light impulses falling on the photo-electric cell 18. The output from the power tri-ode is fed via a centre tapped transformer to a full wave rectifier, and after smoothing by a choke and condensers, a D. C. voltage is obtained across the field 12a associated with armature 12 in Figure 3, which voltage is proportional to the frequency of the light impulses falling on photo-electric cell 18, that is, proportional to the speed of the signal or transmitter, or the speed of the gun motion.

The electrical apparatus here briefly described as associated with the elements 16, 17 and 18 is in Figure 1 to be considered as located within the thermionic amplifier 7. Such apparatus is then alternative to the generator 19 referred to above.

Prior to indicating in greater detail the nature of the thermionic amplifier employed, it will be useful to consider the general function of the apparatus so far described. Through the thermionic amplifier 7 the fine initiating or transmitting unit 2 and the fine repeater or resetting unit 6 are connected so that, with their rotors in a particular position, they are in phase with one another and their total resultant effect is zero. This position corresponds to coincidence and the movement of the fine transmitter away from the coincident position results in progressive angular displacement of the repeater unit 6 in the one direction or the other. Such progressive displacement, by virtue of the arrangement of the thermionic amplifier, produces an output therefrom which is proportional to the degree of the displacement and the direction of which is likewise controlled according to the direction of such displacement. In actual practice, it is found possible to make the electrical arrangement such that four angular degrees of displacement between the fine units produces maximum output from the amplifier.

The relative arrangement of the coarse transmitting unit 1 and the coarse cancelling unit 5 is the same as that of the fine, but that part of the amplifier which deals with the coarse transmission is such that it may override the effect of the fine transmission, and when coincidence is disturbed as between the coarse transmitter and the coarse receiver, the output from the thermionic amplifier depends solely upon the coarse transmission. Preferably, one complete revolution of the coarse transmitter corresponds to 360° of movement of the associated gun mounting. One complete revolution of the fine transmitter corresponds to $1/n$ revolutions of the gun mounting (where, of course, $n$ is greater than 1) with the gear ratio as above referred to. For reasons which are obvious, it will be seen that the whole range of cyclic variations in the fine transmission, i. e. one revolution of the fine transmitter, must be equal to, or slightly greater than, the transmission step of the coarse transmission, the expression "transmission step" here being taken to mean the range of operation of the transmitter within which it is possible to displace the transmitter without producing conditions in the corresponding receiver which cause the latter to follow up the movements of the transmitter.

The electric motor 12 has its field winding, or a field winding, supplied with current in magnitude proportional to the speed of operation of the transmitter or receiver end of the system by employment of the described generator 19 or the photo-electric device having the elements 16, 17 and 18. The whole of the field of the motor is not supplied in this way since, of course, it may be desired for the motor to run whilst the transmitting end of the system is stationary, where, for example, it is necessary for the motor to run in order to bring the receiver into coincidence with the transmitter under these circumstances. Nevertheless, the predominating field of the motor is the variable component indicated, with the result that there is a synchronising force exerted between the transmitter and the receiver ends of the apparatus not wholly dependent merely upon angular displacement therebetween. This synchronising force is combined as a component with that further component obtained through the Selsyn transmission which is essentially producing a control component proportional to actual positional displacement in the system as distinct from the synchronising force which is proportional to speeds in the system. The Selsyn transmission also acts as the recorder and permits movement which cannot be immediately followed by the receiving end of the apparatus to be recorded in, and wrapped-up in, the system until such time as the movement can, in fact, take place.

With regard to the nature of the thermionic amplifier, reference will now be made to Figure 3. It may be divided into three separate parts. There is the first part associated with the fine transmission units 2 and 6 and shown at the left in Fig. 3. The electric current supplied to the rotors of units 2 and 6 is derived by way of transformers $T^1$ and $T^2$, the secondary windings of which respectively go to the grids of thermionic valves $V^1$ and $V^2$, there being one valve in respect to each Selsyn unit. By virtue of the transformers, when there is a phase displacement in a particular direction, as between the two transmitter rotors, an alternating control potential is injected into both associated valves on the grids thereof. It is to be noted that as the electrical arrangement is such that displacement of one rotor in relation to the other gives rise to variation in grid potential of a thermionic valve there is no mechanical reactive component on the rotors of the units and consequently displacement between the rotors does not give rise to mechanical loading of the transmitter of the system.

Depending upon the direction of such phase displacement, the injected alternating potential initiates the operation of one valve or the other. The grids of valves $V^1$ and $V^2$ are suitably biassed by transformers $T^3$ and $T^4$ thereby causing the valves to function in the above manner due to the phase displacement of the rotor circuit adding to or subtracting from the permanent grid bias of $T^3$ and $T^4$.

The anodes of the valves $V^1$ and $V^2$ are respectively connected to transformers $T^9$ and $T^{10}$. The secondaries of these transformers connect to the grids of valves $V^5$ and $V^6$ respectively. These valves may be of the type sold under the registered trade-mark "Thyratron." The valves $V^5$ and $V^6$ associated with the motor armature circuit of the motor 12 constitute the second part of the amplifier, the grids of which are arranged to be controlled by the plate current of the valves $V^1$ and $V^2$ associated with the rotors of the units 2 and 6, it will be observed that the valves $V^5$ and $V^6$ are arranged so that their outputs to the motor armature 12 are in relatively opposite directions. Thus when the anode current of the one of the valves $V^1$ and $V^2$ increases—with, of course, corresponding decrease in the anode current of the other—one of the two valves $V^5$ and $V^6$ operates to supply a working current to the armature 12 in a particular direction. When the other of the valves $V^1$ and $V^2$ has an anode current increased, then the other of the valves $V^5$ and $V^6$ operates to supply a working current in the opposite direction, to said armature 12. The motor armature thus receives current in the one direction or the other corresponding to the direction of phase displacement between the rotors, and to a degree depending upon the extent of such displacement.

The field 12a of the electric motor, as already indicated above, in the illustrated circuit is shown, for the sake of simplicity as being supplied from a generator 19. There may be a further field winding 12b upon the electric motor supplied from some exterior source and adjusted by means of a potentiometer 20 to some suitable value sufficient to prevent total de-energisation of the electric motor. The adjustment of the otherwise constant field provided by the winding 12b of the electric motor will permit adjustment of the synchronising force introduced into the system as a whole.

The coarse transmitting units 1 and 5 similarly have their rotors interconnected through transformers $T^5$ and $T^6$ and the secondaries of these transformers are connected to the grids of valves $V^3$ and $V^4$, the same arrangement of grid biassing being used by means of transformers $T^7$ and $T^8$. The anodes of valves $V^3$ and $V^4$ respectively connect to contactor operating coils C. F. and C. R. When one or the other of these contactor coils is operated on account of rotors 1 and 5 being out of alignment more than a predetermined amount, they open corresponding contacts C. F. and C. R. in the grid circuit of valves $V^6$ and $V^5$ thereby overriding any function of the fine Selsyn units 2 and 6.

Each of the contact breakers C. R. and C. F. is in practice bridged by a feed resistance so that when, say, the contact C. F. is opened by the corresponding relay coil C. F., then the grid control potential of the valve $V^6$ is lowered to a point where the valve fires fully and gives its maximum output. The effect of varying anode current from the valves $V^1$ and $V^2$ will not effectively alter the conditions within the valve $V^6$ under these circumstances and it will continue to give its maximum output until the contact breaker C. F. resumes its closed position which will occur when the rotors 1 and 5 regain alignment.

Figure 2:
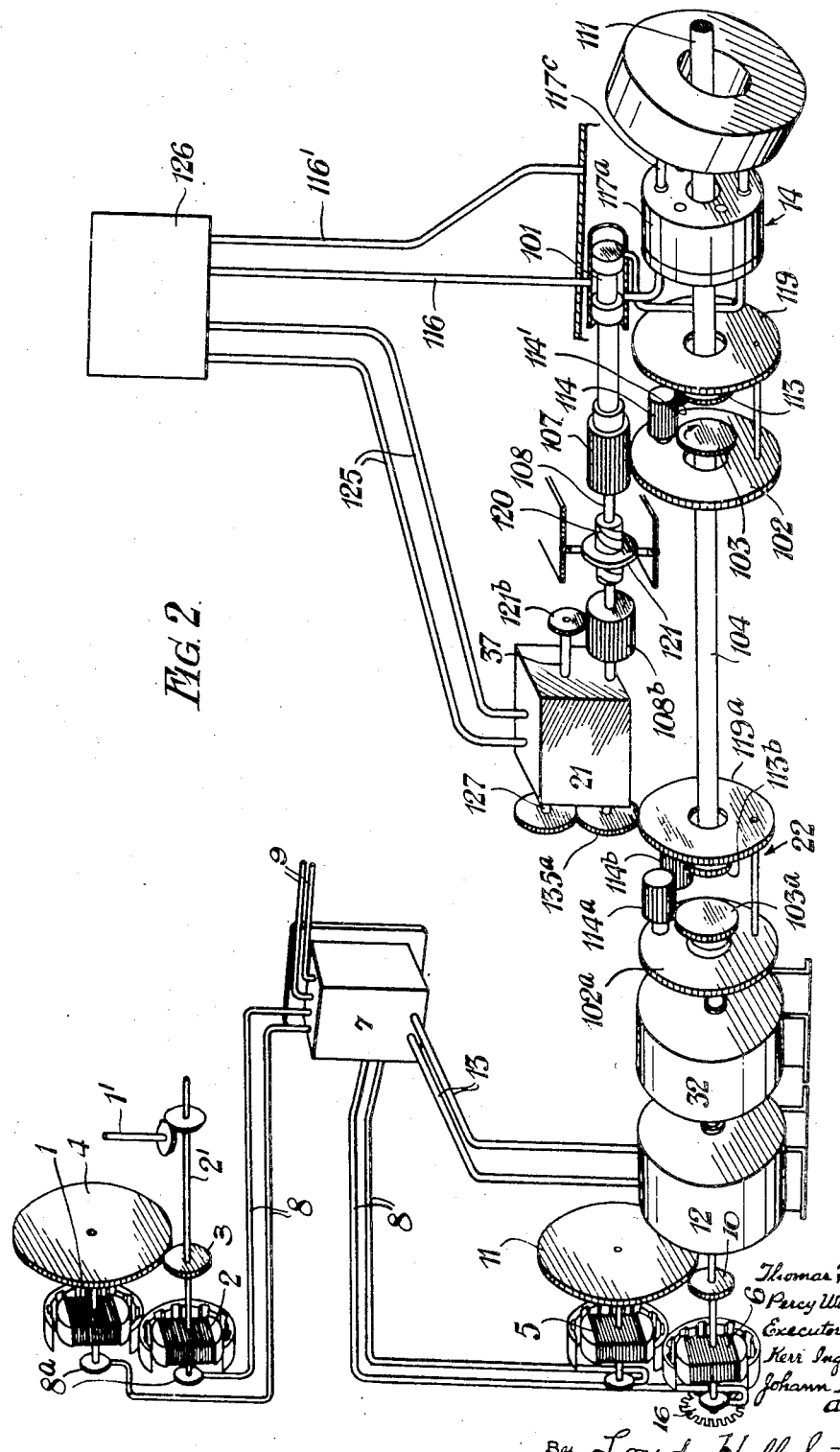
Figure 2 illustrates a modified method of correcting for lag between the output or load driving shaft of the apparatus and the movement initiating means.

Another method of introducing lag correction is shown in Figure 2 in which as in application Serial No. 435,349, now Patent No. 2,412,366, a differential gear 22 is interposed between the motor 12 and the amplifier 14, which amplifier with correction unit 21 is the same as described with reference to Figure 1. That is to say, the hydraulic power amplifier unit 14 has a control valve 101 operated by the side member 102 of a differential gear as a result of rotational movement of the input shaft, one sun member 103 of the differential gear being in driven connection with the sensitive low torque input shaft 104. The output shaft 111 is assumed to be connected to the mass to be moved, e. g. the gun, through the medium of a gear, which according to known practice can include an irreversible worm to prevent the gun from driving back on the output shaft 111.

The side member 102 meshes with and drives a pinion 107, the latter being secured to a shaft 108 coupled with the valve and located in suitable bearings and having a worm thread 120 in threaded engagement with a correspondingly threaded stationary nut member 121, rotational movement of the shaft 108 thus causing the valve not only to be turned about its axis but to be moved longitudinally to effect the opening and closing movement, thus controlling the inflow of oil to the unit, the pinion 107 being of a sufficient width to permit of such longitudinal movement without disengagement of the teeth of the members 107 and 102.

When the input shaft 104 is turned initially, the side member 102 of the differential gear will be displaced by reason of the load imposed on the output shaft 111 which is solid in relation to the sun gear member 113 with which meshes a planet wheel 114' carried by the side member 119 fixed in relation to the side member 102. The planet wheel 114' meshes with the planet wheel 114 carried by the side member 102 and meshing with gear wheel 103 fixed to the input shaft 104 which passes idly through the side member 102. The said displacement of the side member 102 will cause a corresponding longitudinal displacement of the valve 101, to permit of the inflow of the operating fluid, which displacement will continue until the high torque output shaft 111 gains the speed of the input shaft 104, when the valve will remain in that position. The side member 102 of the differential gear, which also controls the correction unit 21 in a manner similar to that previously described with reference to Figure 1, thus has a displacement proportional to the speed of the output shaft 111 and also proportional to the lag in the hydraulic amplifier.

The input shaft 104 is controlled as regards its amount or angle of rotation by remote control means which, as shown diagrammatically embodies coarse and fine Selsyn re-setter units 5 and 6 respectively. These Selsyn units are connected to like initiating units 1 and 2 via the amplifier 7 and have combined therewith the photo-electrical cell means 16, 17 and 18 (disc 16 alone being illustrated in Figure 2), in the same manner as described with reference to Figure 1. The fine Selsyn unit 6 controls the electric motor 12 which, through the medium of the differential gear 22, drives the input shaft 104. The purpose of the supplementary differential gear 22 is to correct for the lag.

The differential gear 22 is identical with the already described differential gear of the hydraulic motor 14, and in this differential gear 22 the input and output sun gear members are indicated by the reference numerals 103a and 113b respectively, the side members by the reference numerals 102a and 119a, and the planet members by the reference numerals 114a and 114b.

The hydraulic power amplifier or motor 14 embodies the known arrangement of parallel axis cylinders 117 in a block 117a, the valve 101 establishing and cutting off the flow of pressure fluid to the valve controlled ports of these cylinders, and the cylinders accommodating pistons 117b connected by rods 117c to the angle box 118, with the result that the cylinder block 117a is caused to rotate when the pistons are displaced by fluid pressure, the cylinder block carrying the output shaft round with it.

The step-by-step operation of the mechanism shown in Figure 2 is as follows: Assuming the input shaft 104 to be turned clockwise the sun member 103 attached thereto will rotate the pinion 114 which, with the co-operating planet wheel 114' will have a translative movement imparted to it about the other sun member 113, thereby causing the side member 102 to rotate in, say, a clockwise direction, pinion 107 thereby causing the hydraulic control valve 101 to be given a combined rotary and longitudinal movement, admitting fluid to the cylinders 117 and causing the cylinder block to rotate the main output shaft 111 in an anti-clockwise direction.

As aforesaid, the shaft 111 is in driving connection with the toothed shaft 112 so that if the input shaft 104 is stopped or decelerated, plant pinions 114, 114' cause the crown wheel or side member 102 to rotate in an anti-clockwise direction, thereby restoring the sliding valve 101 to its original position and bringing the apparatus to rest.

It will thus be seen that when the input shaft 104 is rotated through 10° and then brought to rest, the output shaft 111 is correspondingly turned through 10° and comes to rest.

It will also be appreciated that the relative angular displacement between the shaft 104 and the shaft 111 determines the amount of opening of the valve 101, and therefore that for a given output torque, an increase in the speed of the shaft 111 is due to an increase in the lag or angular displacement between shafts 104 and 111.

The aforesaid differential 22 is, as aforesaid, primarily introduced to correct for lag, for which purpose the side member 119a is in constant mesh with a gear wheel 135a driven by the output shaft 127 of the small hydraulic power amplifier or correction unit 21, which as in the arrangement shown in Figure 1, is a miniature of the main power amplifier 14. The input shaft 37 of this small auxiliary unit 21 is therefore driven off the valve spindle 108, e. g. via gear members 108b and 121b, the valve spindle 108 being slidable axially in bearings in the unit 21. The supply and return conduits for the unit 21 are indicated by the reference numerals 125. Thus, any rotation imparted to the side member 102 operates a valve in the unit 21 in a like manner to the operation of the main valve 101 and the side member 119a of the supplementary differential gear 22 has imparted to it a movement proportional to the movement of the side member 102 of the main differential gear; and provided there is still available a translative displacement of the valve 101, this drive of the side member 119a will introduce the extra movement to the side member 102 to complete the motion of the valve 101, whereupon the rotation of the input shaft 109 of the small unit 21 will be stopped with consequent coming to rest of the small unit.

It will be understood that the constructional form of the invention may be modified in various ways. If so desired, or if thought necessary, the electric motor may be provided with a brake of any known kind capable of loading the latter proportional to its speed. For example, in order to ensure a smooth transmission of power from the motor 12 to the input shaft 104 irrespective of the variations in torque required to move the shaft 104, an artificial load in the form of an electric generator 32 is coupled to the motor 12, the field winding of the generator being permanently energised and the armature virtually short circuited, the power absorbed by the generator being many times greater than the variations in torque which may arise in the shaft 104.

It is of importance to note that with the described apparatus a complete recording and wrap-up system is embodied in the transmission itself, in the sense that should the thermionic amplifier be out of operation temporarily and should the director at the transmitting end be moved, then as soon as the amplifier comes into operation the receiving end will line up with the transmitting end.

It is also important to observe that mechanical load reaction on the electric motor may have the effect of tending to accelerate or decelerate this motor without, in any way, disturbing the transmission system as such, since any incorrectness caused by the reaction of the load will be appreciated by the Selsyn in conjunction with the thermionic amplifier.

What we claim and desire to secure by Letters Patent of the United States is:

1. A power transmission system of the repeater type comprising a Selsyn transmitter unit and a Selsyn receiver unit each having a rotor and a stator, electrical connections between the rotors of said units, a thermionic amplifier disposed in said connections to produce an electrical output corresponding in magnitude and direction to the degree and direction of relative angular displacement of said rotors with respect to their stators, means responsive to such electrical output, an hydraulic swashplate power amplifier having an input means controlled by said responsive means and an output means adapted to drive a gun or other mass to be remotely controlled, and means responsive to relative displacement between said input means and said output means, and interconnecting said output means and said Selsyn receiver unit, for varying the relative angular displacement of said rotors with respect to their stators proportionally to the relative displacement of said input and output means to ensure coincidence between the signal initiated by the Selsyn transmitter unit and the mass to be driven.

2. A power transmission system of the repeater type comprising a Selsyn transmitter unit and a Selsyn receiver unit each having a rotor and a stator, electrical connections between the rotors of said units, a thermionic amplifier disposed in said connections to produce an electrical output corresponding in magnitude and direction to the degree and direction of relative angular displacement of said rotors with respect to their stators, an electric motor, connections between said electric motor and said thermionic amplifier for applying the output from the latter to the motor, an hydraulic swashplate power amplifier having an input shaft driven by said motor and an output shaft adapted to drive a gun or other mass to be remotely controlled, means for controlling the direction and speed of rotation of said output shaft in accordance with the direction and amount of displacement of said control means from a neutral position, means responsive to relative displacement between said input and output shafts for moving said control means from and to said neutral position, and means responsive to relative displacement between said input and output shafts, and interconnecting said output shaft and said Selsyn receiver unit, for varying the relative angular displacement of said rotors with respect to their stators proportionally to the relative displacement of said input and output shafts to ensure coincidence between the signal initiated by the Selsyn transmitter unit and the mass to be driven.

3. A power transmission system of the repeater type comprising a Selsyn transmitter unit and a Selsyn receiver unit each having a rotor and a stator, electrical connections between the rotors of said units, a thermionic amplifier disposed in said connections to produce an electrical output corresponding in magnitude and direction to the degree and direction of relative angular displacement of said rotors with respect to their stators, an electric motor having an armature and a field winding, connections for applying the output of said thermionic amplifier to said armature, means responsive to the speed of operation of the system to produce an electrical output proportional thereto, connections between said means and said field winding, an hydraulic swashplate power amplifier having an input means controlled by the mechanical output of said motor and an output means adapted to drive a gun or other mass to be remotely controlled, and means responsive to relative displacement between said input means and said output means, and interconnecting said output means and said Selsyn receiver unit, for varying the relative angular displacement of said rotors with respect to their stators proportionally to the relative displacement of said input and output means to ensure coincidence between the signal initiated by the Selsyn transmitter unit and the mass to be driven.

4. A power transmission system of the repeater type comprising a Selsyn transmitter unit and a Selsyn receiver unit each having a rotor and a stator, electrical connections between the rotors of said units, a thermionic amplifier disposed in said connections to produce an electrical output corresponding in magnitude and direction to the degree and direction of relative angular displacement of said rotors with respect to their stators, means responsive to such electrical output, an hydraulic swashplate power amplifier having an input shaft controlled by said responsive means and an output shaft adapted to drive a gun or other mass to be remotely controlled, a control valve for said hydraulic amplifier, means for varying the setting of said valve in accordance with variations in the velocities of said input and output shafts, a movable member responsive in its movements to the degree of offset of said valve from a neutral position, and a connection between said member and said means responsive to the output of said thermionic amplifier for advancing said responsive means by an amount proportional to the lag between the input and output shafts of said hydraulic amplifier.

5. A power transmission system of the repeater type comprising a first pair of Selsyn units, one being a transmitter unit and the other a receiver unit and each having a rotor and a stator, a second similar pair of Selsyn units, geared connections between the two transmitter units, geared connections between the two receiver units, electrical connections between the rotors of said first pair of units, electrical connections between the rotors of said second pair of units, a first thermionic valve circuit disposed in said connections between the rotors of said first pair of units, said first thermionic valve circuit having an output proportional in direction and magnitude to the direction and degree of relative angular displacement of the rotors of said first pair of units with respect to their stators, a second thermionic valve circuit, connections between said first and second thermionic valve circuits, a third thermionic valve circuit disposed in the connections between the rotors of said second pair of units, switch means in said second circuit and under the control of said third circuit for producing an output from said second circuit in one direction or the other depending upon the direction of relative angular displacement of the rotors of said second pair of units with respect to their stators, means responsive to the output from said second thermionic valve circuit, an hydraulic swashplate power amplifier having an input means controlled by said responsive means and an output means adapted to drive a gun or other mass to be remotely controlled, and means responsive to relative displacement between said input means and said output means, and interconnecting said output means and the Selsyn receiver unit of said first pair of units, for varying the relative angular displacement of the rotors of said first pair of units with respect to their stators proportionally to the relative displacement of said input and output means.

THOMAS FREDERICK CLARKE,
PERCY WILLIAM COLE,
*Executors of the Estate of Maurice Kerr Ingoldby, Deceased.*
JOHANN HERMANN ABBINK-SPAINK.

REFERENCES CITED

The following references are of record in the file of this patent:

UNITED STATES PATENTS

| Number | Name | Date |
| --- | --- | --- |
| 1,122,942 | Kaminsky | Dec. 29, 1914 |
| 1,684,132 | Hewlett et al. | Sept. 11, 1928 |
| 1,958,245 | Mittag et al. | May 8, 1934 |
| 1,977,624 | Davis | Oct. 23, 1934 |
| 1,985,982 | Edwards | Jan. 1, 1935 |
| 1,999,645 | Wittkuhns | Apr. 30, 1935 |
| 2,188,834 | Fischel | Jan. 30, 1940 |
| 2,191,792 | Hill | Feb. 27, 1940 |
| 2,257,203 | Thacker | Sept. 30, 1941 |
| 2,262,173 | Fischer | Nov. 11, 1941 |

FOREIGN PATENTS

| Number | Country | Date |
| --- | --- | --- |
| 464,716 | Great Britain | Apr. 23, 1937 |
| 489,271 | Great Britain | July 22, 1938 |